United States Patent [19]

Chesley

[11] 4,134,357
[45] Jan. 16, 1979

[54] PNEUMATIC TIRE INFLATION LEVEL INDICATOR

[76] Inventor: Gilman D. Chesley, 22431 Starling Dr., Los Altos, Calif. 94022

[21] Appl. No.: 846,578

[22] Filed: Oct. 28, 1977

[51] Int. Cl.² ............................................. B60C 23/04
[52] U.S. Cl. ................................. 116/34 A; 73/146.2; 152/353 R
[58] Field of Search ............ 116/34 R, 34 A, DIG. 8, 116/DIG. 9; 73/146.2; 200/61.23; 340/58; 152/353 R, 415, 416, 418, 330 R; D12/152

[56] References Cited

U.S. PATENT DOCUMENTS

| | | | |
|---|---|---|---|
| D. 207,570 | 5/1967 | Ueno | D12/152 |
| D. 207,572 | 5/1967 | Ueno | D12/152 |
| 1,870,742 | 8/1932 | Pierce | 116/34 A |
| 1,989,676 | 2/1935 | Bodle | 152/353 R |

*Primary Examiner*—S. Clement Swisher
*Assistant Examiner*—Denis F. Corr
*Attorney, Agent, or Firm*—Flehr, Hohback, Test, Albritton & Herbert

[57] ABSTRACT

Pneumatic tire having an integral inflation indicator in the form of interdigitized groups of raised mesas affixed to the sidewall of the casing on opposite sides of the centerline of the sidewall. The two groups pivot apart by flexing of the sidewall under load when the tire is under-inflated, and they tend to overlap at the centerline when the tire is over-inflated. Indicators carried by the mesas indicate by position the extent of under-inflation or over-inflation.

11 Claims, 6 Drawing Figures

U.S. Patent      Jan. 16, 1979      4,134,357
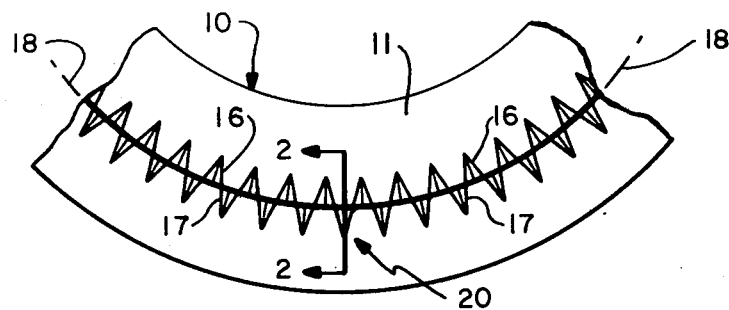
FIG.—1
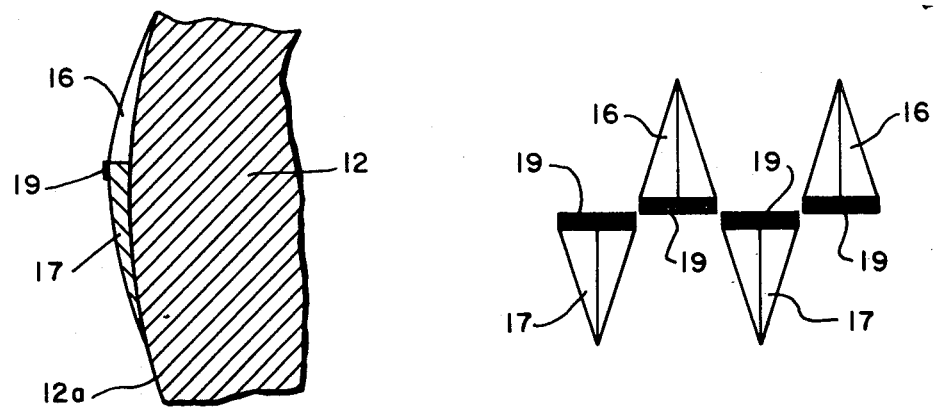
FIG.—2
FIG.—3
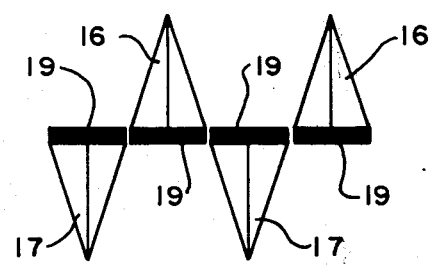
FIG.—4
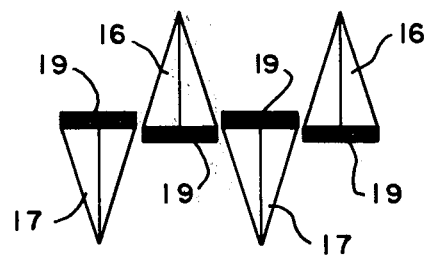
FIG.—5
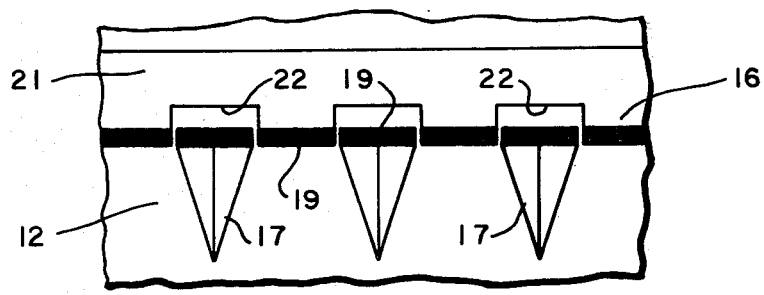
FIG.—6

PNEUMATIC TIRE INFLATION LEVEL INDICATOR

BACKGROUND OF THE INVENTION

This invention pertains generally to pneumatic tires and more particularly to a pneumatic tire having integral means for indicating the inflation level of the tire.

Heretofore, there have been attempts to provide pneumatic tires with means for indicating the inflation level of the tire. However, such attempts have been troubled by problems such as calibration, cost, tire balancing and air leakage, and the most common means of checking inflation is still the hand held pressure gauge.

SUMMARY AND OBJECTS OF THE INVENTION

The invention provides a pneumatic tire having an integral inflation indicator in the form of interdigitized groups of raised mesas affixed to the sidewall of the casing on opposite sides of the centerline of the sidewall. The two groups pivot apart by flexing of the sidewall under load when the tire is under-inflated, and they tend to overlap at the centerline when the tire is over-inflated. Indicators carried by the mesas indicate by position the extent of under-inflation or over-inflation.

It is in general an object of the invention to provide a new and improved pneumatic tire having an inflation level indicator as integral part thereof.

Another object of the invention is to provide a tire of the above character having an inflation indicator in the form of interdigitized groups of flex responsive mesas on the sidewall of the casing.

Another object of the invention is to provide a tire of the above character wherein the mesas have indicators which indicate by position the extent of under-inflation or over-inflatiion of the tire.

BRIEF DESCRIPTION OF THE DRAWINGS

FIG. 1 is a fragmentary side elevational view of one embodiment of a pneumatic tire incorporating the invention.

FIG. 2 is an enlarged fragmentary section view taken along line 2—2 of FIG. 1.

FIGS. 3–5 illustrate the relative positions of the inflation indicators when the tire of FIG. 1 is under-inflated, properly inflated, and over-inflated, respectively.

FIG. 6 is a fragmentary side elevational view of a second embodiment of a tire incorporating the invention.

DESCRIPTION OF THE PREFERRED EMBODIMENTS

In the drawings, the invention is illustrated in connection with a pneumatic tire 10 having a casing 11 with a sidewall 12 which flexes when the tire is under load to an extent dependent upon the level of pressure in the tire.

Two groups of raised mesas 16, 17 are affixed to the outer face 12a of sidewall 12. These mesas are integral parts of the tire, and in the preferred embodiments they are formed during the molding or vulcanizing of the tire. The mesas are spaced circumferentially about the tire, and the two groups are located on opposite sides of the centerline 18 of the sidewall. For purposes of this application, centerline is defined as the line of maximum sidewall flex, rather than the actual geometric centerline of the sidewall. The mesas of the two groups are interdigitized in that mesas 16 are interposed between mesas 17. In the embodiment of FIGS. 1 and 2, each of the mesas has the general shape of isosceles triangle, with the side of the mesa corresponding to the base of the triangle being disposed toward and generally parallel to the centerline of the sidewall. The mesas are of such size, mass and rigidity that they tend to follow the curvature of the sidewall as it flexes.

Indicator means is carried by the mesas for providing an indication of the pressure in the tire. In the embodiments illustrated, this means comprises a raised bead 19 which extends along the edge of each mesa adjacent to centerline 18. For better visibility the beads can be a distinctive color, e.g. white beads on a black side wall. The mesas are positioned in such manner that the beads are aligned along the centerline of the sidewall when the tire is properly inflated.

In addition to indicating whether the tire is properly inflated, the indicators of the invention can also indicate the extent of under-inflation or over-inflation. In one particularly preferred embodiment, the beads on the mesas are formed with a width corresponding to the nominal range of proper inflation for the tire. In this embodiment the widths are such that the beads on adjacent mesas will be at least partly aligned when the pressure is within the nominal or safe range.

Operation and use of the tire are as follows. When the tire is inflated to the proper pressure and placed under load, the flexing of the sidewall in the region 20 between the wheel and ground, where the maximum loading and flex occur, is such that the lines or beads on adjacent mesas are aligned along the centerline, as illustrated in FIG. 4. When the tire is under-inflated, the sidewall flexes to a greater extent and the beads pivot apart as illustrated in FIG. 3. When the tire is over-inflated, the sidewall flexes relatively little, and the indicator lines overlap or extend across the centerline, as illustrated in FIG. 5.

The embodiment of FIG. 6 is generally similiar to the embodiment of FIG. 1, except mesas 16 are formed as part of a raised annular strip 21 rather than being individual triangular bodies. In this embodiment, mesas 16 are formed as fingers which extend radially along one side of the annular strip, with relieved areas 22 between the fingers for receiving the mesas 17 of the second group. If desired, mesas 17 can also be formed as fingers extending from the edge of a raised strip similar to strip 21. Operation of this embodiment is identical to that described above.

The invention has a number of important features and advantages. It permits the inflation level of a tire to be checked quickly and accurately without a guage or other manual operation. It is economical to manufacture and overcomes the other disadvantages of the inflation indicators of the prior art.

It is apparent from the foregoing that a new and improved tire and inflation level indicator have been provided. While only the presently preferred embodiments have been described, as will be apparent to those familiar with the art, certain changes and modifications can be made without departing from the scope of the invention as defined by the following claims.

What is claimed is:

1. In a pneumatic tire having a casing which flexes under load to an extent dependent on the pressure in the tire: a first group of raised mesas affixed to the outer face of the sidewall of the casing on one side of the centerline of the sidewall, a second group of raised mesas affixed to the outer face of the sidewall on the other side of the centerline and interposed between the mesas of the first group, said groups of mesas tending to pivot away from the centerline upon flexing of the sidewall when the pressure in the tire is below a predetermined level and to overlap at the centerline when the pressure is above the predetermined level, and indicator means carried by the mesas for providing an indication of the pressure in the tire by the relative positions of the indicator means on adjacent ones of the mesas.

2. The tire of claim 1 wherein the indicator means is positioned for alignment along the centerline when the tire is inflated to the predetermined level.

3. The tire of claim 1 wherein the indicator means comprises means defining lines entending in a direction generally parallel to the centerline of the sidewall.

4. The tire of claim 3 wherein the lines are of such width that the lines on adjacent ones of the mesas are at least partially aligned when the pressure in the tire is within a predetermined range.

5. The tire of claim 3 wherein the lines are a distinctive color.

6. The tire of claim 1 wherein the mesas have a generally triangular shape, the side of each mesa corresponding to the base of the triangle being disposed toward and generally parallel to the centerline of the sidewall.

7. The tire of claim 1 wherein the mesas of the first group are formed as fingers entending radially along one side of a raised annular strip with relieved areas between the fingers for receiving the mesas of the second group.

8. In a pneumatic tire having a casing which flexes under load to an extent dependent on the pressure in the tire: a first group of raised mesas affixed to the outer face of the sidewall of the casing on one side of the centerline of the sidewall, and a second group of raised mesas affixed to the outer face of the sidewall on the other side of the centerline and interposed between the mesas of the first group, said groups of mesas tending to pivot away from the centerline upon flexing of the sidewall when the pressure in the tire is below a predetermined level and to overlap at the centerline when the pressure is above the predetermined level.

9. In a pneumatic tire having a casing which flexes under load to an extent dependent on the pressure in the tire: a first group of raised mesas affixed to the outer face of the sidewall of the casing on one side of the centerline of the sidewall, a second group of raised mesas affixed to the outer face of the sidewall on the other side of the centerline and interposed between the mesas of the first group, said groups of mesas tending to pivot away from the centerline upon flexing of the sidewall when the pressure in the tire is below a predetermined level and to overlap at the centerline when the pressure is above the predetermined level, and a raised bead carried by each of the mesas adjacent to the centerline for providing an indication of the pressure in the tire by the relative positions of the beads on adjacent ones of the mesas.

10. The tire of claim 9 wherein the beads are positioned for alignment along the centerline when the tire is inflated to the predetermined level.

11. The tire of claim 9 wherein the beads extend in a direction generally parallel to the centerline of the sidewall and are of such width that the beads on adjacent ones of the mesas are at least partially aligned when the pressure in the tire is within a predetermined range.

* * * * *